United States Patent
Mützenberg et al.

(10) Patent No.: US 7,988,868 B2
(45) Date of Patent: Aug. 2, 2011

(54) METHOD AND DEVICE FOR DEWATERING AND DRYING SOLID OR LIQUID MIXTURES

(75) Inventors: Willy Mützenberg, Kriegstetten (CH); Egon Hoffmann, Leipzig (DE)

(73) Assignee: Dehydry Anlagenbau AG, Basel (CH)

( * ) Notice: Subject to any disclaimer, the term of this patent is extended or adjusted under 35 U.S.C. 154(b) by 0 days.

(21) Appl. No.: 12/441,158

(22) PCT Filed: Sep. 5, 2007

(86) PCT No.: PCT/DE2007/001591
§ 371 (c)(1),
(2), (4) Date: Mar. 13, 2009

(87) PCT Pub. No.: WO2008/031401
PCT Pub. Date: Mar. 20, 2008

(65) Prior Publication Data
US 2009/0308817 A1    Dec. 17, 2009

(30) Foreign Application Priority Data

Sep. 14, 2006  (DE) .......................... 10 2006 043 969
Aug. 22, 2007  (DE) .......................... 10 2007 039 583

(51) Int. Cl.
 *B01D 25/168* (2006.01)
 *B01D 37/04* (2006.01)
 *B01D 35/18* (2006.01)
(52) U.S. Cl. ........ 210/741; 210/771; 210/178; 210/185; 210/225; 210/231; 210/808
(58) Field of Classification Search .......................... None
See application file for complete search history.

(56) References Cited

U.S. PATENT DOCUMENTS
6,387,282 B1 *  5/2002  Heckl et al. ................... 210/770
(Continued)

FOREIGN PATENT DOCUMENTS
CH    685 805 A5    10/1995
EP    0 263 197 A1    4/1988
(Continued)

OTHER PUBLICATIONS
Translation of IPER of 12 Pages.*

*Primary Examiner* — Robert James Popovics
(74) *Attorney, Agent, or Firm* — McGlew and Tuttle, P.C.

(57) ABSTRACT

A method is provided for both dewatering and drying solid-liquid mixtures and a device is provided designed as a filter press drier for the application of the method. The filter press drier is equipped with a defined number of metal heating chamber filter plates (1) and/or membrane heating chamber filter plates (2) arranged next and/or in parallel to one another. The method includes feeding of the suspension, draining off the filtrate while retaining the solid components as a filter cake at the same time, heating of the filter cake, pressing of the filter cake formed during the dewatering, drying of the filter cake by evacuating the vapor space (4) and the interconnected pore volume in the filter cake, filling of the vapor space (4) and the interconnected pore volume in the filter cake with air or an inert gas to an excess pressure of up to 1 bar, where a resting phase is initiated in drying, and the filter cake is again heated, repeating the drying and filling steps until the intended degree of drying is reached, switching off the heating circuit and terminating the membrane pressing an removing the dried filter cake. A surprising increase in the rate of drying is achieved.

9 Claims, 3 Drawing Sheets

U.S. PATENT DOCUMENTS

| | | | |
|---|---|---|---|
| 6,641,726 B1 * | 11/2003 | Sebastian | 210/225 |
| 2006/0180553 A1 * | 8/2006 | Pfeiffer | 210/772 |
| 2009/0308817 A1 * | 12/2009 | Mutzenberg et al. | 210/741 |

FOREIGN PATENT DOCUMENTS

| | | | |
|---|---|---|---|
| EP | 0 759 318 A1 | | 2/1997 |
| WO | WO 2005/016487 | * | 2/2005 |

* cited by examiner

METHOD AND DEVICE FOR DEWATERING AND DRYING SOLID OR LIQUID MIXTURES

CROSS REFERENCE TO RELATED APPLICATIONS

This application is a United States National Phase application of International Application PCT/DE2007/001591 and claims the benefit of priority under 35 U.S.C. §119 of German Patent Application DE 10 2006 043 969.4 filed Sep. 14, 2006, and German Patent Application DE 10 2007 039 583.5 filed Aug. 22, 2007 the entire contents of which are incorporated herein by reference.

FIELD OF THE INVENTION

The present invention pertains to a method for both dewatering and drying suspensions and slurries or other solid-liquid mixtures and to a device designed as a filter press drier for the application of the method.

BACKGROUND OF THE INVENTION

Solid-liquid mixtures, which are generated in chemical production processes, waste recycling or energy generation from wastes, disposal of wastes or in food technology and processing technology, are usually dewatered and dried in two separate plants, e.g., by mechanical dewatering with centrifuges, belt presses or filter presses in a first step and chemical drying in rotary drum, disk or paddle trough mixers in a subsequent, second step. The multistep plants require a complicated device and are cost-intensive. Since the multistep plants are usually operated continuously, drying must be carried out in the shortest contact times possible. In addition, great temperature differences of 100° C. to 500° C. are needed between the material being dried and the heating surfaces or dying means. The temperature range must be between 150° C. and 600° C. The use of thermal energy at this high temperature level, which otherwise remains reserved for power generation, for use for evaporating water alone in drying plants, is not meaningful economically and ecologically.

A device for dewatering and drying solid particles dispersed in liquids is known from EP 0 263 197 B1, in which the mechanical dewatering and subsequently the thermal drying are carried out in a single device, avoiding complicated, multistep plants and apparatus. The dewatering and drying is carried out intermittently in batch operation. Contrary to the continuously operated drying methods, the contact times are markedly longer in intermittent batch operation. The drying can therefore be carried out with small temperature differences of 10° C. to 90° C. between the heating surface and the material being dried at a temperature level of 20° C. to 130° C. However, the slow drying of the material from the outside and inside in the form of a drying front, which migrates from the heating surface into the interior of the material being dried, is a drawback of this method called simple vacuum drying. An extremely dry layer, which acts as an insulating wall, is formed in the material being dried at the heating surface. The heat transport into the interior of the material being dried is greatly hindered hereby and this insulating wall progressively becomes thicker in parallel to the heating surface as drying progresses. Very long drying times are needed for reaching the goal of drying as a consequence of the formation of this layer.

EP 0 759 318 B1 discloses a method for dewatering and drying solid-liquid mixtures, in which the drying operation is effectively accelerated in a single device by oscillating between two pressure levels or two temperature levels. The heat transport from a diaphragm heated with a heat carrier medium to the evaporation front in the interior of the material being dried and the vapor transport from the inside to the outside are markedly improved by the introduction of rinsing gas compared to the solution according to EP 0 263 197 B1. The rinsing gas reduces the buildup of an insulating wall in parallel to the heating surface. Thus, the heat transport persists via liquid bridges into the interior of the material being dried and the drying times become shorter during progressing drying as well. However, the drying times are, on the whole, still too long. The drying method according to EP 0 759 318 B1 is therefore not commercially applicable as yet compared to the continuously operated two-stage drying plants. Competitiveness can be achieved with further improvements only.

The heat transfer from the heat carrier medium to the material being dried is composed of the heat fluxes in the individual layers of material located one after the other. Since materials consisting of polypropylene, EPDM or other plastics are usually used for the diaphragms, the heat transfer from the heat flux through the material of the diaphragm selected is limited, and the plastics used have a low thermal conductivity and low temperature stability.

The heat transport can be improved by using heating surfaces made of metal. Thus, a welded chamber hot plate made of special steel with typical meandering guiding of the heating water, with which relatively short drying times can be reached, is known from the patent specification according to CH 685 805 A5. However, the welded chamber hot plates made of special steel have the drawback that the costs of the starting material and also the manufacturing costs are very high. In addition, the durability of the weld seams is greatly reduced under the usual drying conditions (high temperatures/corrosive liquids). However, welded chamber hot plates made of metal have not, on the whole, proved successful.

SUMMARY AND OBJECTS OF THE INVENTION

The object of the present invention is to develop a method and a device for using the method, with which the dewatering and drying of solid-liquid mixtures can be achieved in a single plant with cost-effective equipment and with short drying times as well as low drying temperatures, which are below 130° C.

This object is accomplished with a device designed as a filter press drier in the following process steps:

a) Feeding of the slurry to be treated into the device, b) drawing off of the filtrate via the ducts while at the same time retaining the solid components as a filter cake through the filter medium, c) heating of the filter cake to an excess temperature above the boiling point by switching on the heating agent circuit, d) pressing the filter cake formed during the dewatering by membrane pressing by means of a gas or a liquid, e) connection of a vacuum unit to the ducts and evacuation of the vapor space and of the interconnected pore volume in the filter cake, whereby the drying of the filter cake is started; the filter cake cools to the boiling point by extracting the energy of evaporation from the interior of the filter cake, f) filling of the vapor space and of the interconnected pore volume in the filter cake with air or an inert gas to an excess pressure of up to 1 bar, whereby a phase of rest is initiated during drying, and the filter cake is again heated to excess temperature, g) repetition of steps e) and f) until the intended degree of drying is reached, h) switching off of the heating agent circuit and conclusion of membrane pressing, and i) removal of the dried filter cake from the device in the known manner.

This method is called cyclic vacuum-excess temperature contact drying. It has the peculiarity that the filter cake is cyclically cooled from excess temperature to the boiling point and is again heated to excess temperature during resting pauses without vacuum, and this energy, supplied during the resting pause and leading to the heating to the excess temperature, is again available as energy of evaporation in the interior of the filter cake in the next cycle.

In summary, the following progress is made by making improvements on the routing of heat and the removal of vapors:

1. The vapor stream is several times larger during vacuum drying in the excess temperature range above the boiling point than in case of vacuum drying at the boiling point, because the internal energy being stored during the resting pause without vacuum from the heating to excess temperature is still available for the evaporation in addition to the heat supplied from the outside via the metal filter plates. In addition, the internal heat distributed in the entire filter cake brings about evaporation of water, i.e., drying in the interior of the filter cake as well.

2. The filling of the interconnected pore volume with air or an inert gas brings about a number of effects in the filter cake. The presence of air induces a capillary film flow from the large capillaries back to the small capillaries. The liquid is again redistributed over the entire interconnected pore volume. The newly formed liquid bridges and liquid films are again available due to the heat being conducted from the heating surface into the center of the filter cake. Therefore, the entire large inner liquid surface participates in the subsequent evaporation. Internal drying is achieved, which is much faster and greater than evaporation at a drying front, which is moving inwardly into the filter cake in parallel to the heating surfaces located on the outside.

Since the vapor is flowing at a higher velocity in the pores in the presence of air than in the absence of air, the cyclic filling of the pores with air or an inert gas additionally brings about a faster vapor transport from the inside to the outside, into the atmosphere outside the filter cake. Recondensation within the filter cake is thus avoided.

The heat transport from the heating surfaces located on the outside into the interior of the filter cake is also improved by the cyclic filling of the pores with air or an inert gas, because, according to the so-called heat pipe effect, it is only in the presence of air that the vapor flows from the hot, moist pore walls in the vicinity of the heating surface located on the outside to the cold pore walls into the interior of the filter cake. The cold pore walls are also heated, in addition to the heat transfer by heat conduction, by the heat of condensation of the vapor. The vapor transport supports the heat conduction overproportionally, because, coupled with the vapor, the heat of condensation is transported as well. This so-called heat pipe effect is dominant especially in the temperature range of 60° C. to 90° C.

3. During evacuation, the vapor is sent from the interconnected pore volume of the filter cake into the vapor space of the drainage, which vapor space is formed as a gap over the entire heating surface by means of a drainage medium. The vapors are guided via this gap from the entire heating surface/drainage surface to the circumferential expansion joint and from there into the circumferential ring channel. The vapors are sent from the circumferential ring channel into the larger vapor extraction ducts to the condenser and to the vacuum unit. On the chamber filter plates during heating with rising pressure according to an aspect of the invention leads to better heat transfer from the hot plates to the filter cake due to direct contact. As a result, the volume reduction of the filter cake, which is associated with the dewatering process, is counteracted, because decreasing contact would lead to poorer heat transfer. The pressure is raised in steps during the membrane pressing in order to overcome internal frictional resistances in the filter cake. A pressure increase in increments of 3 bar has proved to be especially favorable here.

Due to the deliberately slow buildup of vacuum, the vapor velocities in the ducts are kept low and blocking with total loss of pressure is avoided. Since the density of the vapors remains higher over a longer time with delayed expansion, the delay results in a markedly larger vapor mass flow.

A filter press drier device according to the invention for the application of the above-described method must be especially suitable for bringing about the alternation between the process steps of generating a vacuum and filling of the drying chamber with air or inert gas under favorable conditions and for rapidly removing the larger amounts of vapors generated during the improved drying.

Thus, the use of a basic body, which has the dimensions and design of a commercially available chamber filter press, is provided for the filter press drier, the metal plates being arranged on both sides in the half chambers formed by the support wall and the chamber wall. These metal heating chamber filter plates are combined in the plate package with membrane heating chamber filter plates.

The two metal plates are clamped in a fixed manner by screw connections against spacers and firmly centered at the middle duct for feeding the suspension and screwed to the basic body. This design is associated with the advantages that a torsionally rigid metal plate body is formed, which is stable under pressure and is mounted freely floating in relation to the basic body and the support wall and forms the heating chamber with the support wall located on the inside. Especially advantageous are the mechanical stability of the metal plate body to the pressure of the heating medium and the independence of the metal plate body during unequal thermal expansion of the metal plate body in relation to the basic body made of a plastic, which is formed from the support wall and the chamber wall.

The use of a basic body, which has the dimensions and design of a commercially available membrane chamber filter plate instead of a chamber filter plate, is a special embodiment, in which a metal plate is arranged on one side of the filter plate on the bottom of one half chamber and a heatable membrane is arranged on the other side of the membrane chamber filter plate on the bottom of this half chamber. This embodiment is associated with the advantage that all filter plates of a plate package can be made as plates of the same design, except for the head filter plate and the end filter plate.

At the outer edge of the metal plate, the basic body has a circumferential expansion joint, which is intended, on the one hand, to allow the different expansions of the materials used for the metal heating chamber filter plate, and is used, on the other hand, as a filtrate outlet during filtration and as a vapor exhaust during drying.

A circumferential ring channel, which is used as an expansion space, i.e., a vapor dome for the vapors, is milled in under the expansion joint. This design is especially advantageous for drawing off large amounts of vapors, because the vapors flow through the interconnected pore volumes in the filter cake with flow cross sections in the μm range, in the mm range in the drainage gap and in the cm range in the ring channel, so that the vapor velocities can be increased in increments along the path and the pressure losses decrease in increments along the path.

The smooth surfaces of the metal plates can be manufactured in a simple manner and at a low cost and are technologically advantageous. The plate surfaces are wetted by capillary film flow during the resting pauses in the drying method according to the present invention and these liquid films are again evaporated, i.e., dried, during the vacuum phases. To achieve unhindered draining of the filtrate during filtration and rapid removal of vapors during drying, a separate drainage medium of a special design, comprising a metal cloth or textile fabric, is arranged on this smooth surface.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
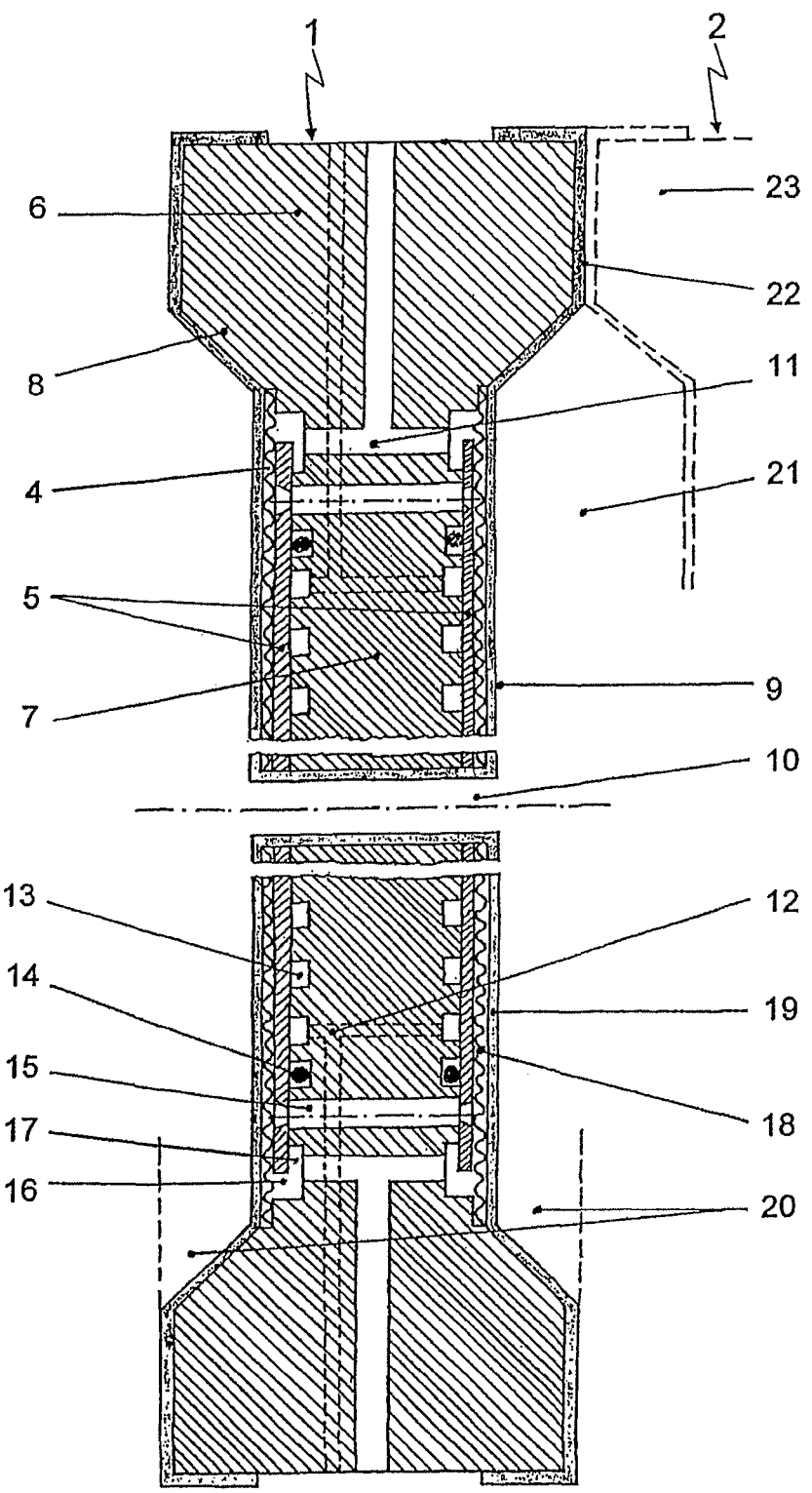
FIG. 1 is a sectional view of a metal heating filter chamber plate belonging to a filter press drier with metal plates arranged on both sides and an adjacent membrane heating chamber filter plate.

Referring to the drawings in particular, the metallic heating chamber filter plate 1 shown in FIG. 1 is one of many, with which a filter press drier for dewatering and drying solid-liquid mixtures can be equipped. The design of this metal heating chamber filter plate 1 corresponds to the basic body 6 of a conventional, commercially available chamber filter press, which basic body is provided with a support wall 7 and with a chamber wall 8. The principal advantage of the use of such a chamber filter plate is the low manufacturing costs.

The basic body has a duct 10 for feeding the suspension into the entire chamber 21 and is surrounded with a filter medium 19. Metal plates 5, which are clamped together into a metal plate body with screw connections and spacers 15 and cover the support wall 7, are located on both sides of the basic body 6. By means of the sealing ring 14, the metal plates 5 seal the heating chamber 13, which traverses the surface of the support wall 7 in the form of ducts, against the entire chamber 21 in a fluid-tight manner. The entire chamber 21 itself is formed from two half chambers 20. The half chamber 20 is in turn defined by the chamber bottom 9, which is also the filter surface at the same time and defines the chamber edge. The entire chamber 21 is formed due to the fact that the adjacent chamber filter plate 23 and the metal heating chamber filter plate 1 are arranged next to each other. The entire chamber 21 is sealed towards the outside by the sealing surface 22, which is lined with the filter medium 19. The basic body 6 is traversed by a series of ducts 10, 11, 12, which have different functions. Duct 10 is used to feed the suspension into the individual entire chambers 21 of the filter press drier. The duct 11 integrated in the basic body 6 is used as a filtrate outlet and vapor outlet and is connected to the circumferential ring channel 17, to the circumferential expansion joint 16 and to the drainage on the metal plate 5, via which the fluid connection with the entire chamber 21 is established. Duct 12, which is likewise milled into the basic body 6, is used to feed and drain off the heating medium. The heating chamber 13 is filled with the heating medium, which preferably consists of water, via this duct 12.

A sealing ring 14, which seals the heating space 13 against the entire chamber 21, is arranged between the basic body 6 and the metal plate 5 in the outer edge of the heating space 13. The metal plates 5 are clamped together with screw connections and spacers 15 into a metal plate body, which floatingly surrounds the basic body 6. A drainage medium 18, through which the filtrate and the vapors flow off, is located directly on the metal plate 5.

A vacuum unit, not shown in the drawings, belongs to the filter press drier.

Figure 2:
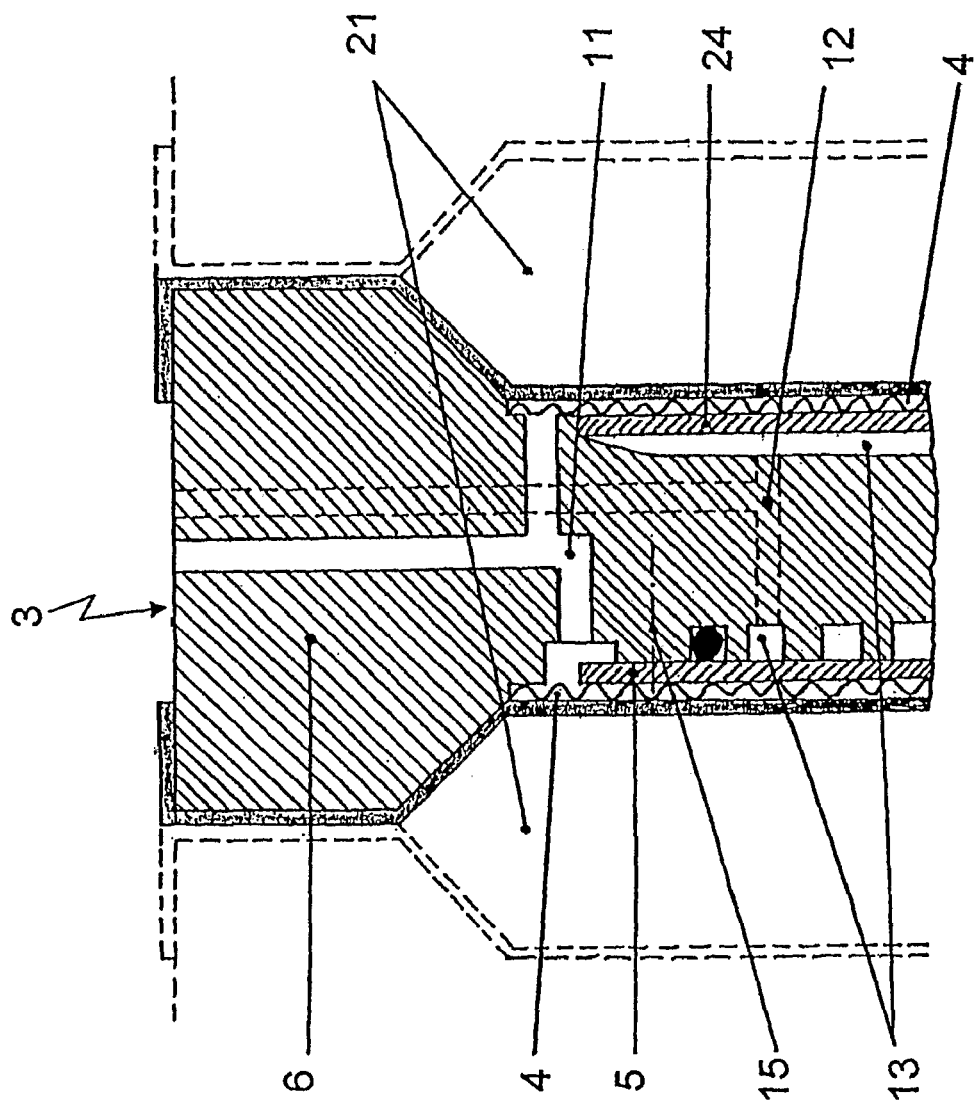
FIG. 2 is a sectional view through the top half of a combined metal membrane heating chamber filter plate, which is equipped on one side with a metal plate and on the other side with a membrane.

The upper part of a combined metal membrane heating chamber filter plate 3 is shown in the drawing according to FIG. 2. The basic body 6 thereof comprises a membrane heating chamber filter plate 2, in which the design of the metal heating chamber filter plate 1 according to the present invention with metal plate 5 and with circumferential expansion joint 16 and ring channel 17 is embodied on one side, while the other side remains unchanged. A drainage medium 18, which forms the drainage gap 4, is arranged on both the heatable membrane 24 and the metal plate 5. Starting from a membrane heating chamber plate 2, a heatable membrane 24 has been practically replaced by a metal plate 5 in this embodiment of the combined metal membrane heating chamber filter plate 3 according to the present invention.

The filter press drier may have different designs as a device for the application of the method. Thus, the following types of plates can be used in the filter press drier in various combinations and arrangements in relation to one another:

metal heating chamber filter plates,
membrane heating chamber filter plates,
combined metal membrane heating chamber filter plates and/or
chamber filter plates.

These plates may consist of different materials and are arranged such that optimal drying effect occurs depending on the particular application.

The method with a filter press drier, which is equipped with a defined number of metal heating filter chamber plates and/or membrane heating chamber filter plates according to FIGS. 1 and 2, takes place as follows:

The suspension is fed through duct 10 to the entire chamber 21 until this is filled completely. To enable the filtrate to escape, it is drawn off via the ducts 11. At the same time, the solid components are retained as filter cake by the filter medium 19. The filter cake formed is pressed against metallic heating chamber filter plates 1 arranged between two membrane heating chamber filter plates 2 by pressing the membrane 24 onto the filter cake by means of a gas or a liquid while simultaneously heating the metal heating chamber filter plates 1 and the filter cake.

The vapor space 4 is connected to the vacuum unit and is evacuated through this, while the vapors are drawn off. The drying step thus initiated is subsequently interrupted again by filling the vapor space 4 and the interconnected pore volume with air or an inert gas. The phase of drying and the resting phase are subsequently repeated alternatingly so often that the intended degree of drying is reached. The dried filter cake is removed at the end of the process by opening the filter press.

A surprising increase in the rate of drying is achieved compared to the solutions known from the state of the art by the mechanical alternation between the application of vacuum and the filling of the vapor space 4 and the interconnected pore volume with air or inert gas, and the drying times are reduced to a fraction of the times otherwise necessary in case of simple vacuum drying.

Figure 3:
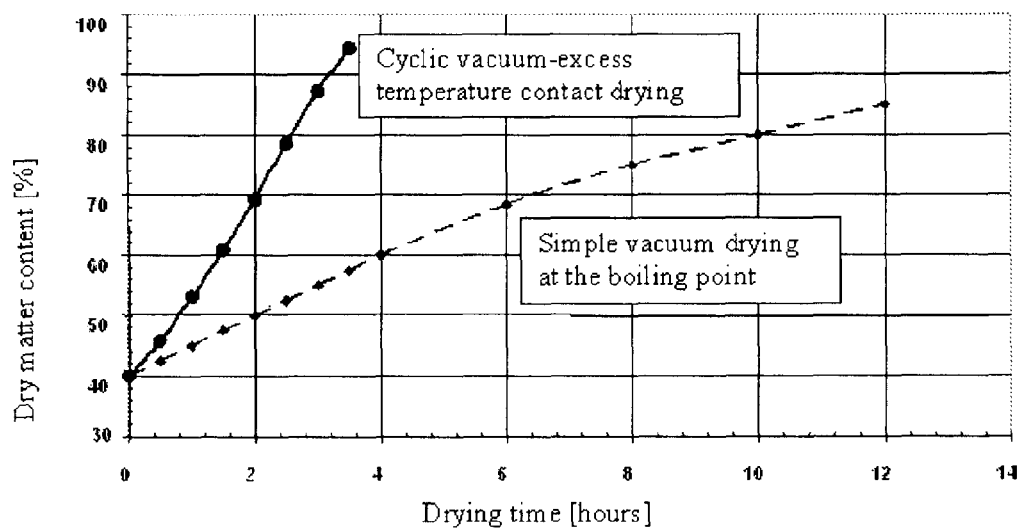
FIG. 3 is a graphical view of the dry matter content that can be reached with simple vacuum drying at boiling point compared to cyclic vacuum-excess temperature contact drying as a function of the drying time.

FIG. 3 shows the dry matter content that can be reached with simple vacuum drying at boiling point compared to cyclic vacuum-excess temperature contact drying as a function of the drying time.

FIG. 3 shows that a markedly longer drying time is obtained in the normal case of application with the simple vacuum drying at the boiling point than with cyclic vacuum-excess temperature contact drying. Thus, a dry matter content of 70% is reached already after 2 hours and 87% after 3 hours, whereas only 50% is reached after 2 hours and only 55% after 3 hours with the simple vacuum drying. The rate of drying is increased tremendously by the constant alternation between vacuum and filling with air or inert gas and the drying times are reduced to a fraction of the time that is otherwise necessary, so that high throughput capacities are reached.

While specific embodiments of the invention have been shown and described in detail to illustrate the application of the principles of the invention, it will be understood that the invention may be embodied otherwise without departing from such principles.

The invention claimed is:

1. A method for dewatering and drying solid-liquid mixtures, the method comprising the steps of:
   a) feeding a suspension to be treated via a duct into a device;
   b) draining of a filtrate via ducts while retaining solid components as a filter cake with a filter medium;
   c) heating the filter cake by switching on a heating circuit;
   d) pressing the filter cake formed during dewatering by membrane pressing by means of a gas or a liquid;
   e) connecting a vacuum unit to the ducts and evacuating a vapor space and an interconnected pore volume in the filter cake, whereby the drying of the filter cake is started and the filter cake cools due to the extraction of the energy of evaporation from the interior of the filter cake;
   f) filling the vapor space and the interconnected pore volume in the filter cake with air or an inert gas to an excess pressure of up to 1 bar, wherein a resting pause is initiated in drying, and the filter cake is heated up again;
   g) repeating said steps e) and f) until an intended degree of drying is reached;
   h) switching off the heating circuit and terminating the membrane pressing; and
   I) removing the dried filter cake from the device.

2. A method for dewatering and drying solid-liquid mixtures in accordance with claim 1, wherein the filter cake is pressed onto the surface of the heated metal heating chamber filter plate during the heating prior to drying in a plurality of pressure increments with increasing pressure in increments of 3 bar.

3. A method for dewatering and drying solid-liquid mixtures in accordance with claim 1, wherein a ventilation of the vacuum unit and the drainage space with air or an inert gas is controlled by means of a controllable valve, which is arranged in the vicinity of the vacuum unit, according to a freely selectable program in a time- and pressure-dependent manner and a buildup of the vacuum is delayed at the time of switchover to drying and the delay is adapted to the amounts of vapor generated.

4. A device for dewatering and drying solid-liquid mixtures comprising:
   an intermittently operating filter press drier comprising:
   a feed for feeding a solid-liquid mixture into the device;
   a vacuum unit;
   an air or inert gas feed for generating an air or inert gas atmosphere with an excess pressure of up to 1 bar;
   a defined number of metal heating chamber filter plates and/or membrane heating chamber filter plates arranged next to and in parallel to one another;
   chambers formed between the metallic heating chamber filter plates and/or membrane heating chamber filter plates for receiving the solid-liquid mixture to be treated; and
   a vapor outlet, wherein each of the metal heating chamber filter plates comprises a basic body with half chambers formed on both sides by a support wall and a chamber edge and metal plates arranged on both sides, wherein each of the membrane heating chamber filter plates comprises a basic body with half chambers formed on both sides by a support wall and a chamber edge and membranes arranged on both sides, wherein the two metal plates are clamped firmly by screw connections against spacers and are centered and screwed firmly at the middle duct for the suspension feed and form a torsionally rigid metal plate body that is stable under pressure, wherein the torsionally rigid metal plate body, which is stable under pressure, is mounted floatingly in relation to the basic body and the support wall.

5. A device in accordance with claim 4, wherein the intermittently operating filter press drier is equipped with a defined number of metal membrane heating chamber filter plates combined next to and in parallel to one another, which metal membrane heating chamber filter plates comprise a basic body with half chambers formed on both sides by a support wall and a chamber edge and is equipped with a metal plate on one side and with a membrane on the other side.

6. A device in accordance with claim 4, wherein a circumferential expansion joint is milled into the basic body in the area of a circumference of the metal plate and a circumferential ring channel is milled in under it, which also form the filtrate outlet during filtration and the vapor outlet during drying.

7. A device in accordance with claim 5, wherein a circumferential expansion joint is milled into the basic body in the area of a circumference of the metal plate and a circumferential ring channel is milled in under it, which also form the filtrate outlet during filtration and the vapor outlet during drying.

8. A device in accordance with claim 4, wherein the metal plate has a smooth surface, at which a separate drainage medium, comprising a metal cloth or textile fabric, is arranged.

9. A device in accordance with claim 4, wherein the metal plate has a smooth surface, at which a separate drainage medium, comprising a metal cloth or textile fabric, is arranged.

* * * * *